United States Patent [19]
Wright et al.

[11] Patent Number: 5,831,213
[45] Date of Patent: Nov. 3, 1998

[54] ELECTRICAL OUTLET BOX AND REMOVABLE CLAMP THEREFOR

[75] Inventors: Ronald Dean Wright, Byhalia, Mich.;
  Claude J. Bauer, Greenbrier, Tenn.;
  Oral F. Leep, Cottontown, Tenn.;
  Michael A. Swiney, Gallatin, Tenn.

[73] Assignee: Thomas & Betts Corporation, Memphis, Tenn.

[21] Appl. No.: 816,444

[22] Filed: Mar. 12, 1997

[51] Int. Cl.[6] ........................................... H02G 3/18
[52] U.S. Cl. ............................................. 174/64; 220/242
[58] Field of Search ................................. 174/53, 54, 55, 174/59, 60, 64, 65 R, 50, 49, 58; 220/3.2, 3.8, 4.02, 241, 242

[56] References Cited

U.S. PATENT DOCUMENTS

| | | |
|---|---|---|
| 3,049,585 | 8/1962 | Cochran . |
| 3,126,184 | 3/1964 | Kropp . |
| 3,420,482 | 1/1969 | Taylor . |
| 4,012,580 | 3/1977 | Arnold ...................................... 174/53 |
| 4,202,457 | 5/1980 | Tansi ........................................ 220/3.3 |
| 4,277,641 | 7/1981 | Bauer et al. . |
| 4,316,999 | 2/1982 | Nattel .................................... 174/65 R |
| 4,350,839 | 9/1982 | Lass . |
| 4,591,658 | 5/1986 | Bauer et al. . |
| 4,865,281 | 9/1989 | Wollar . |
| 4,972,044 | 11/1990 | Kropa ..................................... 174/65 R |
| 5,040,752 | 8/1991 | Morrison . |
| 5,316,245 | 5/1994 | Ruckwardt . |

*Primary Examiner*—Kristine L. Kincaid
*Assistant Examiner*—Dhiru R Patel
*Attorney, Agent, or Firm*—Hoffmann & Baron, LLP

[57] ABSTRACT

An electrical junction box assembly for accommodating an electrical cable inserted therein. The assembly includes a junction box and a cable clamp. The junction box includes a back wall and a side wall which perimetrically extends from the back wall to define an open end opposite the back wall. The junction box further includes a cable entry opening in the side wall for permitting insertion of the cable thereinto. The back wall further includes a cable clamp mount positioned adjacent the cable entry opening. The cable clamp mount has a clamp insertion surface positioned substantially orthogonal to the cable entry opening. The clamp insertion surface defines a cable clamp insertion aperture into which the cable clamp is manually removably insertable. The cable clamp includes a deflectable cable engagement arm spaced adjacent from the cable entry opening of the side wall of the junction box. The deflectable cable engagement arm resiliently supports the cable inserted through the cable entry opening against that side wall of the box defining the cable entry opening through which the cable is inserted.

18 Claims, 6 Drawing Sheets

ELECTRICAL OUTLET BOX AND REMOVABLE CLAMP THEREFOR

FIELD OF THE INVENTION

The present invention relates generally to electrical outlet boxes. More specifically, the present invention relates to an outlet box and a removable clamp which is supported therein to hold electrical wires or cables inserted into the outlet box for connection to an electrical fixture.

BACKGROUND OF THE INVENTION

An electrical outlet box provides a termination point for wires carrying electrical current through buildings, houses, and other structures. Wiring entering an outlet box is typically connected to a particular electrical fixture such as a receptacle or switch. These fixtures may be mounted within the box for termination to an end extent of the wiring which is also inserted into the box. The box is then typically covered by a face plate having an opening therein to allow access to the receptacle outlet or the switch while preventing electrified components from being exposed. Outlet boxes may be employed in concealed-wiring installations in which they are located within a wall or ceiling. Alternatively, outlet boxes may be used in exposed-conduit wiring installations where they are exteriorly mounted to a wall, column or ceiling.

Outlet boxes are available in a variety of configurations and sizes. The selection of which type of box to use is dependant upon the specifics of the application. Outlet boxes typically include a plurality of openings which provide entry for the wires into the box. These openings are usually covered by removable portions called "knockouts" which can be easily removed by the installer as required. With most electrical fixtures, the outlet box is spacious enough to accommodate sufficient length of excess wiring to allow a connected fixture to be removed from the outlet box and serviced without disconnecting the fixture from the wiring.

To install the electrical fixture, an installer pulls one end of an electrical wire or cable, through a knockout opening. An excess length of wire is pulled through the knockout allowing for the electrical fixture to be attached to the conduit at a location outside the outlet box where the installer has more room to work. The end of wire is connected to the electrical fixture which is then mounted adjacent the open face of the outlet box. The outlet box has sufficient volume and depth for excess wire to be packed into the box behind the fixture.

Often times, the person who threads the wire through the outlet box will not be the same person who then installs the fixture. Therefore, during installation, the step of pulling an excess length of wire through the box aperture may not immediately precede the step of connecting the wire to an electrical fixture. Furthermore, even if those steps are consecutively performed, the installer would preferably not have to continuously restrain the wire while connecting the fixture. Towards this end a clamp is employed to hold the wire in place and thereby free the installer's hands for other tasks. The use of a clamp to hold the wire in place also allows for a wire to be pulled through and held in the outlet box long before an installer arrives to connect a fixture. Using a clamp also frees the installer to perform other tasks during installation without needing to continuously hold the wire in place.

Many of the prior art clamps require the installer to thread wire through the clamp or are otherwise difficult to work with once installed.

U.S. Pat. No. 4,277,641 to Bauer discloses a cable clamp attachment for an electrical outlet box. The clamp of the '641 patent mounts to the outlet box so as to seat against the wall surface defining the cable-entry aperture. A wire, which is thereafter inserted into the box, must pass through an aperture in the clamp so as to be engaged by a flexible barb which restricts wire withdrawal back out through the aperture. One drawback to the clamp of the '641 patent is that the wire must be threaded through the clamp itself. If the wire is threaded through a clamp already mounted in the box, the wire is all but forced to enter the box cavity in a direction substantially perpendicular to the wall of the insert aperture. Since the insert aperture is typically located on a side wall at the rear of the box, the wire will thus be directed to the deepest portion of the box from where the installer must grab hold of it to pull outside the open front face of the box. If the clamp is to be installed in the box only after the wire has been threaded therethrough, the installer must be able to deflect the wire so as to align the clamp with its seating hole. Some wires will be too large in diameter to accommodate such mounting of the clamp. Either method of using the clamp of the '641 patent will require the extra time and attention of the installer.

U.S. Pat. No. 4,591,658 to Bauer discloses a cable clamp attachment for an electrical outlet box. The clamp of the '658 patent is insertable into a mounting hole which is co-planar with the cable-entry aperture. This clamp provides a flexible finger with a free end that extends over the cable-entry aperture so that as a cable is inserted therethrough, the free end of the clamp is deflected and urges the incoming wire against the edge of the entry aperture. Should an installer desire to extract a portion of the inserted wire, the clamp of the '658 patent requires a screwdriver to continuously engage the clamp to deflect the free end of the clamp from the inserted wire. The dimensions of the outlet box may not readily accommodate such deflection and thus makes wire removal difficult for the installer It can be appreciated that the above techniques of the prior art are cumbersome and require excessive installer dexterity. It is therefore desirable to provide an electrical outlet box which accommodates a clamp which may be quickly and easily removed and inserted and which allows easy threading of a wire through an outlet box without the difficulties of the prior art devices.

SUMMARY OF THE INVENTION

It is an object of the present invention to provide an outlet box that includes a removably insertable clamp for holding in place a wire inserted through the outlet box.

It is another object of the present invention to provide an outlet box that includes a clamp that allows a relatively light pulling force to advance more wire through an insertion aperture in the box while also providing relatively strong resistance to any force having a tendency to withdraw the conduit back through the aperture It is still further an object of the present invention to provide an outlet box that includes a clamp that allows easy threading of a wire through an outlet box while preventing the unintentional withdrawal of the wire back out of the box In the efficient attainment of these and other objects, the present invention provides a cable clamp for use with an electrical junction box. The cable clamp is manually removably insertable into a clamp insertion aperture in the electrical junction box. The electrical junction box includes a back wall and a side wall perimetrically extending from the back wall and defines an open end opposite the back wall.

The electrical junction box includes a cable entry opening in the side wall for permitting insertion of the cable thereinto and the back wall includes a cable clamp mount positioned adjacent the cable entry opening. The cable clamp mount further includes a clamp insertion surface positioned substantially orthogonal to the cable entry opening which further defines a cable clamp insertion aperture. The cable clamp includes a deflectable cable engagement arm spaced adjacent from the cable entry opening in the wall of the electrical junction box. The deflectable cable engagement arm resiliently supports a cable inserted through the cable entry opening against a side wall of the electrical junction box that defines the cable entry opening through which said cable is inserted.

DETAILED DESCRIPTION OF THE INVENTION

Figure 1:
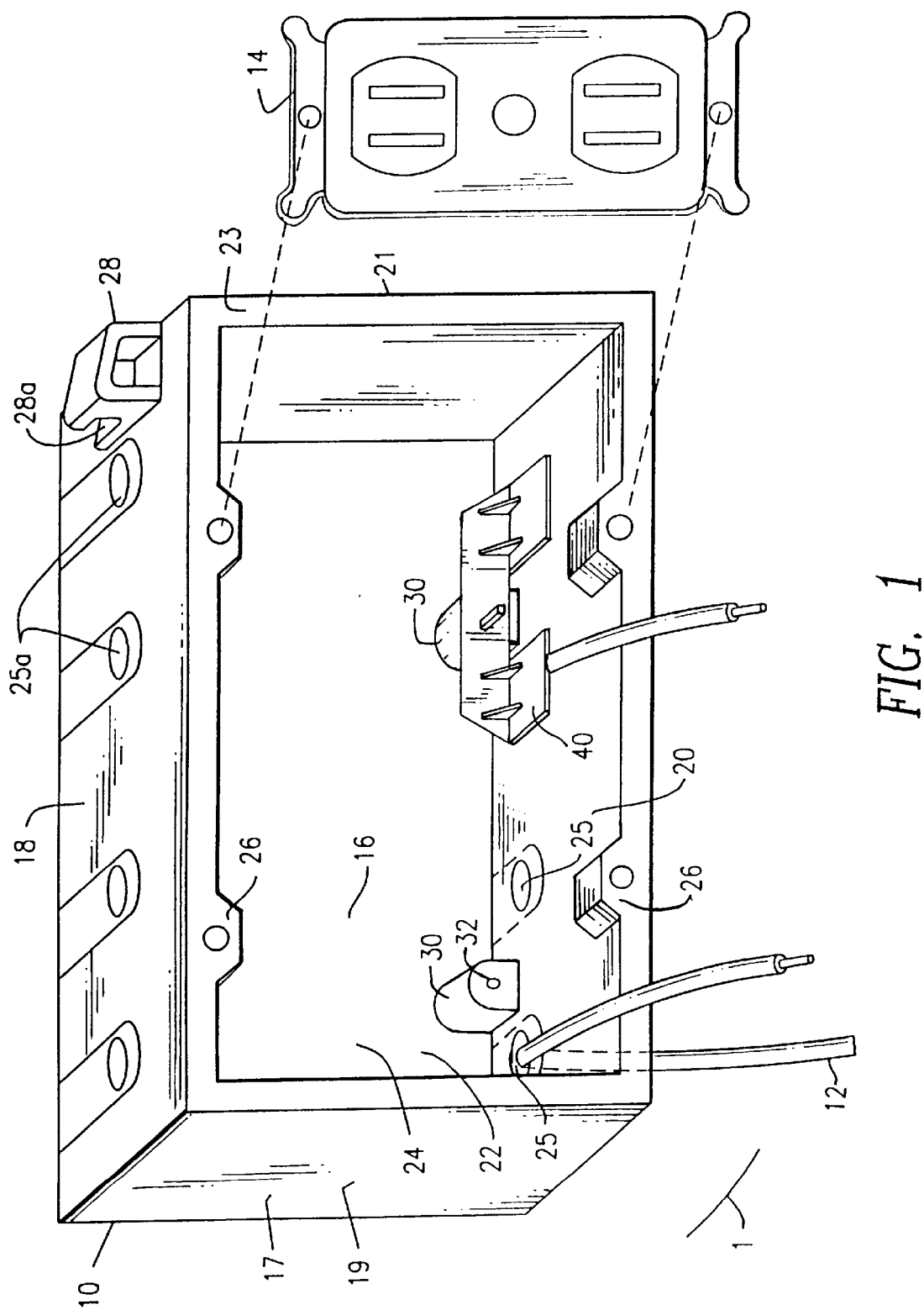
FIG. 1 is a perspective showing of an electrical outlet box which may be used in combination with a cable clamp of the present invention for terminating an electrical wire to a receptacle or other electrical fixture.

With reference to FIG. 1, an outlet box assembly 1 formed in accordance with the present invention is shown. The outlet box assembly 1 is adapted to accommodate a wire 12 to be connected to a receptacle 14 or another electrical fixture, such as a switch (not shown). The outlet box assembly 1 further includes a clamp 40 for holding a length of wire 12 installed in the outlet box 10, as will be further discussed below. Outlet box 10 is formed from a non-metallic material and is preferably formed from a phenolic resin material or polycarbonate. Clamp 40 is preferably formed from a molded elastomer such as polyvinyl chloride (PVC) or polycarbonate.

With further reference to FIG. 1, outlet box 10 includes a substantially planar rectangular back wall 16 that is perimetrically bounded by an outer wall 17 defining an outlet box interior 22. Outer wall 17 extends from back wall 16 ending in a peripheral rim 23 that defines an opening 24 into box interior 22. Outer wall 17 is comprised of a top wall 18, side walls 19, 21, and bottom wall 20. The number of electrical fixtures mountable to outlet box 10 is a function of the width of the outlet box, which is generally described as the distance between opposing side walls 19 and 21. The preferred embodiment of outlet box 10, as shown in FIG. 1, is a flush device box designed to accommodate two fixtures although it is contemplated that the outlet box assembly of the present invention may be employed to accommodate more or less fixtures. Preferably, the height of the outlet box, which is generally defined as the distance between opposing top wall 18 and bottom wall 20, is approximately 3 5/16 inches in order to accommodate most standard electrical fixtures. The present invention also contemplates that the outlet box may be round in shape as is typical for ceiling-mounted outlet boxes.

Additionally, top and bottom walls 18 and 20 further include a plurality of wire openings 25 through which electrical wiring 12 can enter the interior 22 of outlet box 10. Wire openings 25 are preferably closed by knockouts 25a which are preferably frangibly formed with box 10. Top and bottom walls 18 and 20 also include bead projections 26 along peripheral rim 23, shown in FIG. 1 as projecting inwardly toward box interior 22. Each of the bead projections 26 are adapted to receive conventional fastening hardware (not shown) used to secure electrical fixtures such as receptacle 14 to outlet box 10. Receptacle 14 may be supported in box 10 using screws or other fastening hardware as is well known in the electrical connection art.

Outlet box 10 further includes insertion shoulders 30 adjacent the apertures 25. Each insertion shoulder 30 is contiguous with back wall 16. Each insertion shoulder 30 defines a clamp insertion bore 32 for accepting a clamp 40. Clamp insertion bore 32 runs generally perpendicular to back wall 16. Clamp insertion bore 32 is fully defined by a threaded cylindrical inner surface on insertion shoulder 30 (not shown).

The outlet box may also include a pair of mounting wings 28 extending exteriorly from the top and bottom walls 18, 20. Mounting wings 28 are generally wedge-shaped members which abut against a surface, such as a wall stud (not shown), to which outlet box 10 is to be mounted. Fastening hardware such as nails, screws or the like are then driven through channels 28a provided in the mounting wings and into the stud to securely hold outlet box 10 thereagainst. It is contemplated by the present invention that the mounting wings may assume other forms, such as right-angle flanges or separate attachable metal brackets, for assisting the mounting of the outlet box to a mounting surface.

Figure 2:
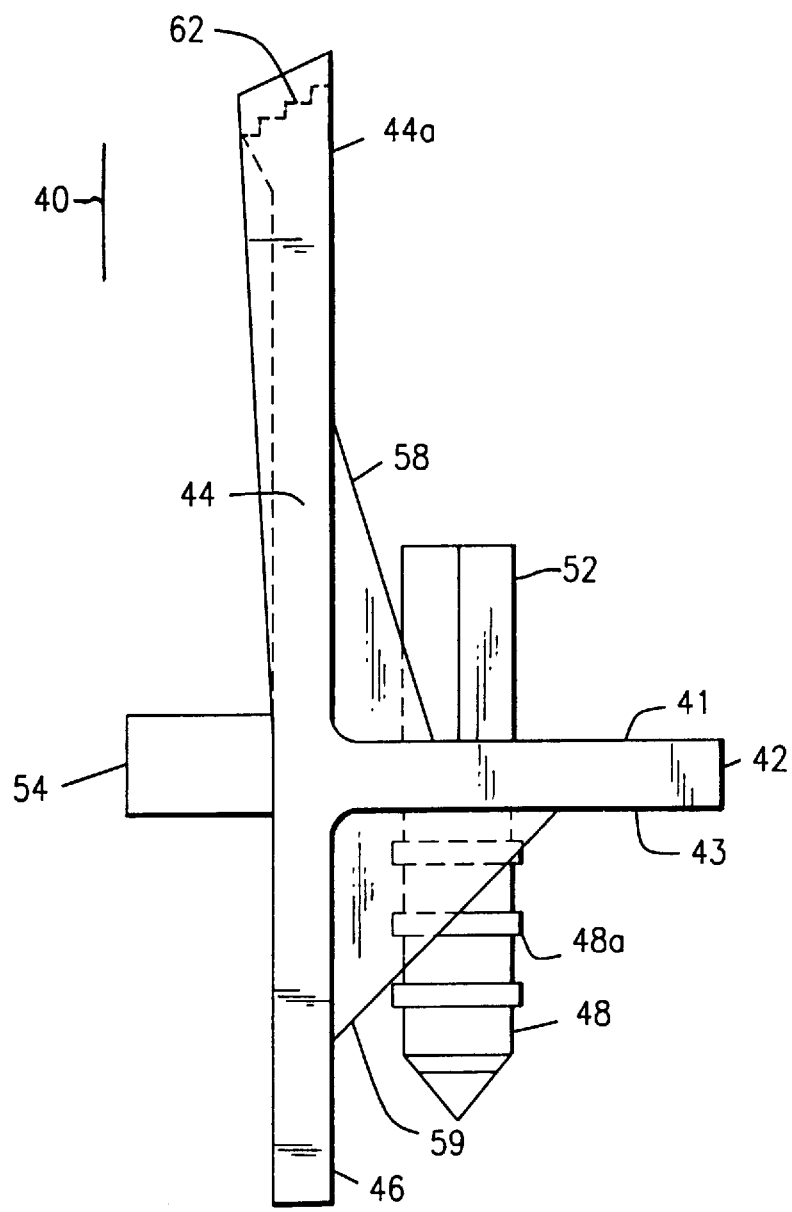
FIG. 2 is a side view of a clamp of the present invention used in combination with the box of FIG. 1.
Figure 3:
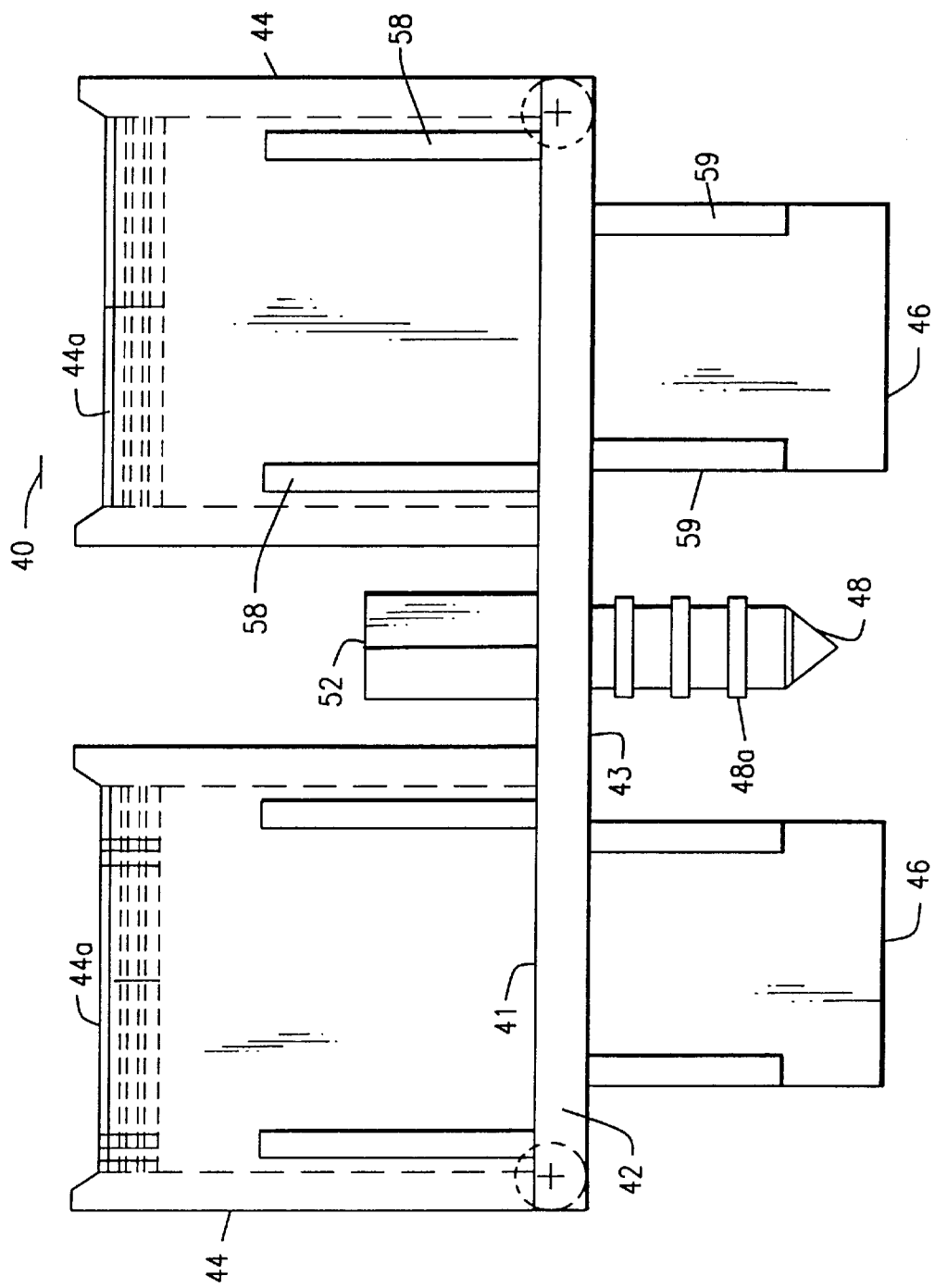
FIG. 3 is a front view of the clamp of FIG. 2.
Figure 4:
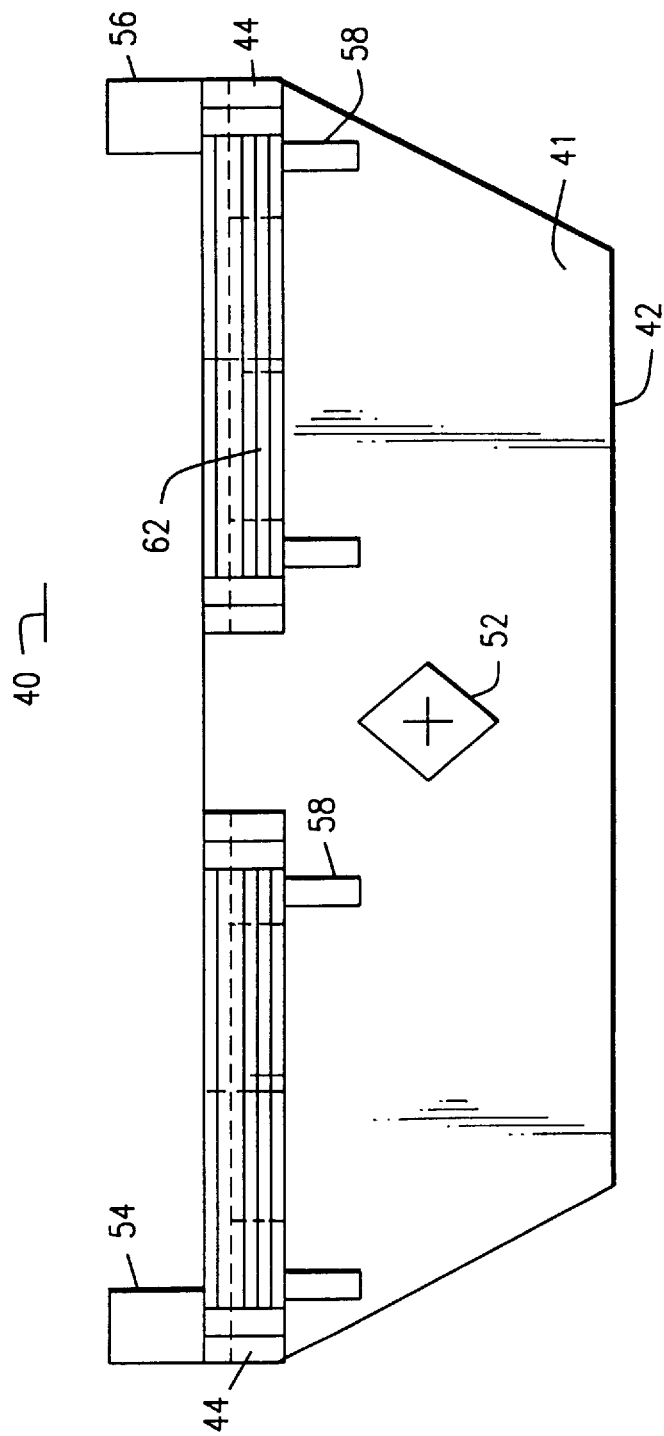
FIG. 4 is an top view of the clamp of FIG. 2.

Referring to FIGS. 2–4, the clamp 40 of the present invention is shown. Clamp 40 generally includes a planar base 42, having opposed major surfaces 41 and 43. Clamp 40 also includes a pair of ascending arms 44 in flush edge relationship with major surface 41. Ascending arms 44 are spaced apart a distance which is equal to the distance between apertures 25 of box 10 so that ascending arms 44 align therewith upon insertion of clamp 40 into the adjacent insertion bore 32. As clamp 40 is formed of a resilient elastomer, ascending arms 44 are resiliently cantileverally deflectable so as to deflect when engaging an inserted wire 12.

Clamp 40 may also include a pair of descending arms 46 located in flush edge relationship with major surface 43. As depicted herein, ascending arms 44 and descending arms 46 are preferably coplanar. When clamp 40 is inserted in insertion bore 32, descending arms 46 extend towards back wall 16. Clamp 40 also includes a central mounting stem 48 descending from major surface 43 for removable insertion into insertion bore 32 of outlet box 10. Central mounting stem 48 includes resiliently deformable annular rings 48a which provide removable retention of clamp 40 when inserted into insertion bore 32 of shoulder 30. An opposed finger stem 52, located on major surface 41, assists the installer when inserting or removing clamp 40 from bore 32. Clamp 40 may also include tabs 54, 56 which extend out from clamp 40 to engage wall 17 and prevent clamp 40 from significantly rotating about mounting stem 48. Clamp 40 may further include upper bracing members 58 and lower bracing members 59 to provide structural rigidity to ascending arms 44 and descending arms 46, respectively. Ascending arms 44 preferably include ridges 62 formed thereon distal end 44a. Ridges 62 engage the outer surface of the portion of wire 12 inserted through aperture 25 into outlet box 10.

Figure 5:
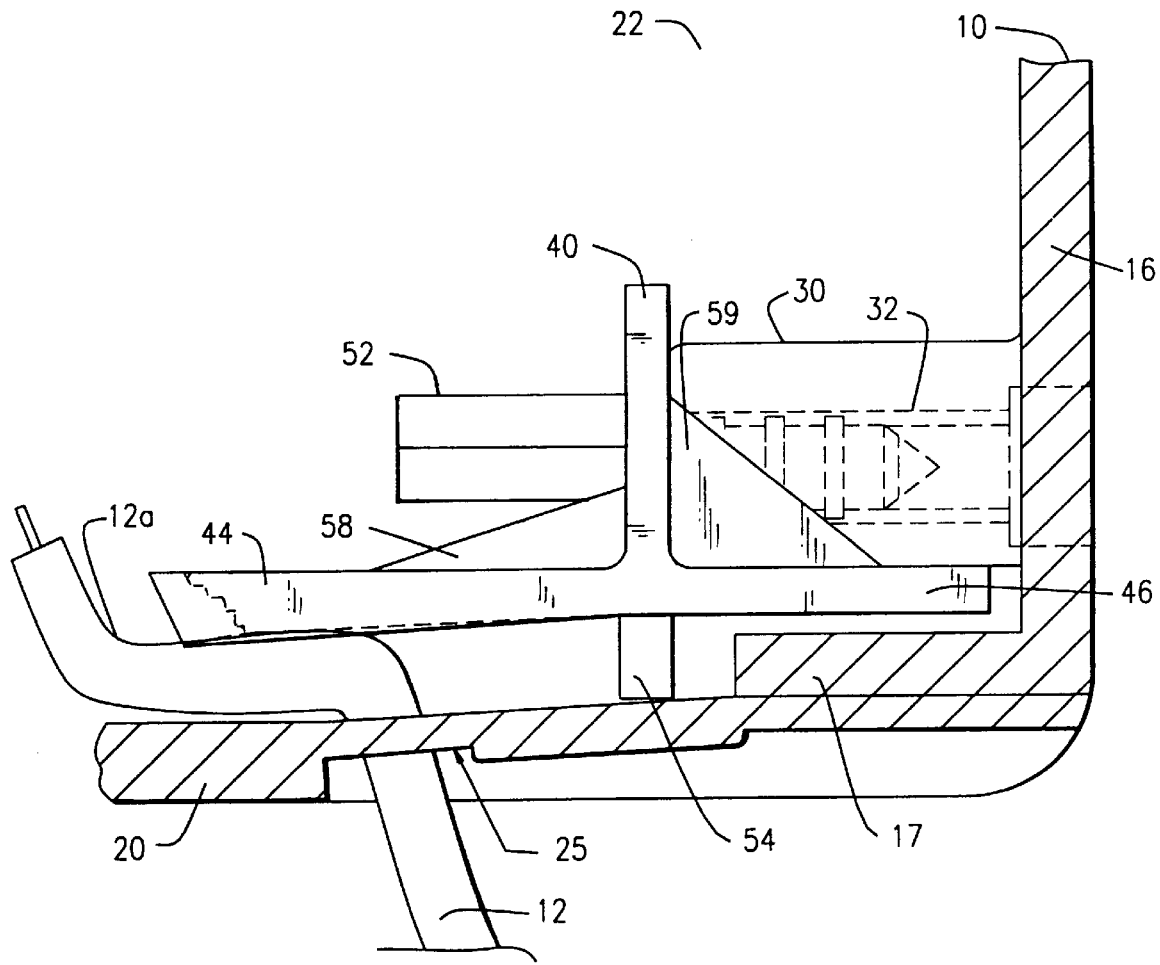
FIG. 5 is a cut-away view of the clamp of FIG. 2 inserted into an outlet box of FIG. 1.

FIG. 5 is a partial cut-away view of a clamp 40 of the present invention inserted into the insertion shoulder 30 of the outlet box 10 of the present invention. Wire 12 has been inserted through aperture 25 into the outlet box interior 22. Phantom lines in FIG. 5 shows how ridges 62 engage and hold wire 12 against that wall 18, 20 of the box defining the particular aperture 25 through which the wire is inserted. The clamp has been inserted into insertion shoulder 30 adjacent the aperture 25 through which the wire is inserted. Shoulder 30 forms a clamp mount for supporting the clamp. Ascending arms 44 will be disposed adjacent apertures 25. However, when both a clamp 40 and an inserted wire 12 are present, the wire will engage the clamp at the ridges 62 at the free end of the ascending arm 44. As clamp 40 engages wire 12, ascending arms 44 deflect about base 42. Depending on the exact geometry of the outlet box, descending arms 46 may engage wall 17 and provide stiffening support against deflection of ascending arms 44 and, therefore, a stronger holding force against the inserted wire 12. Bracing members 58, 59 provide further stiffening support to ascending arms 44. The force applied by the ridges 62 against wire 12 serves to hold wire 12 against wall 17 and prevents withdrawal of the wire back through aperture 25. Side ridges 65, transversely aligned with ridges 62, retain wire 12 therebetween and thereby against ascending arm 44.

Tabs 54 and 56 may also engage the wall defining the aperture 25, or extend very close thereto, and prevent substantial rotation of the clamp about mounting stem 48 in insertion bore 32 to thereby further increase the holding effectiveness of the clamp. The upper and lower bracing members 58, 59 may be employed to still further resist deflection of the ascending and descending arms and thereby still further increase the holding force provided by the clamp.

Figure 6:
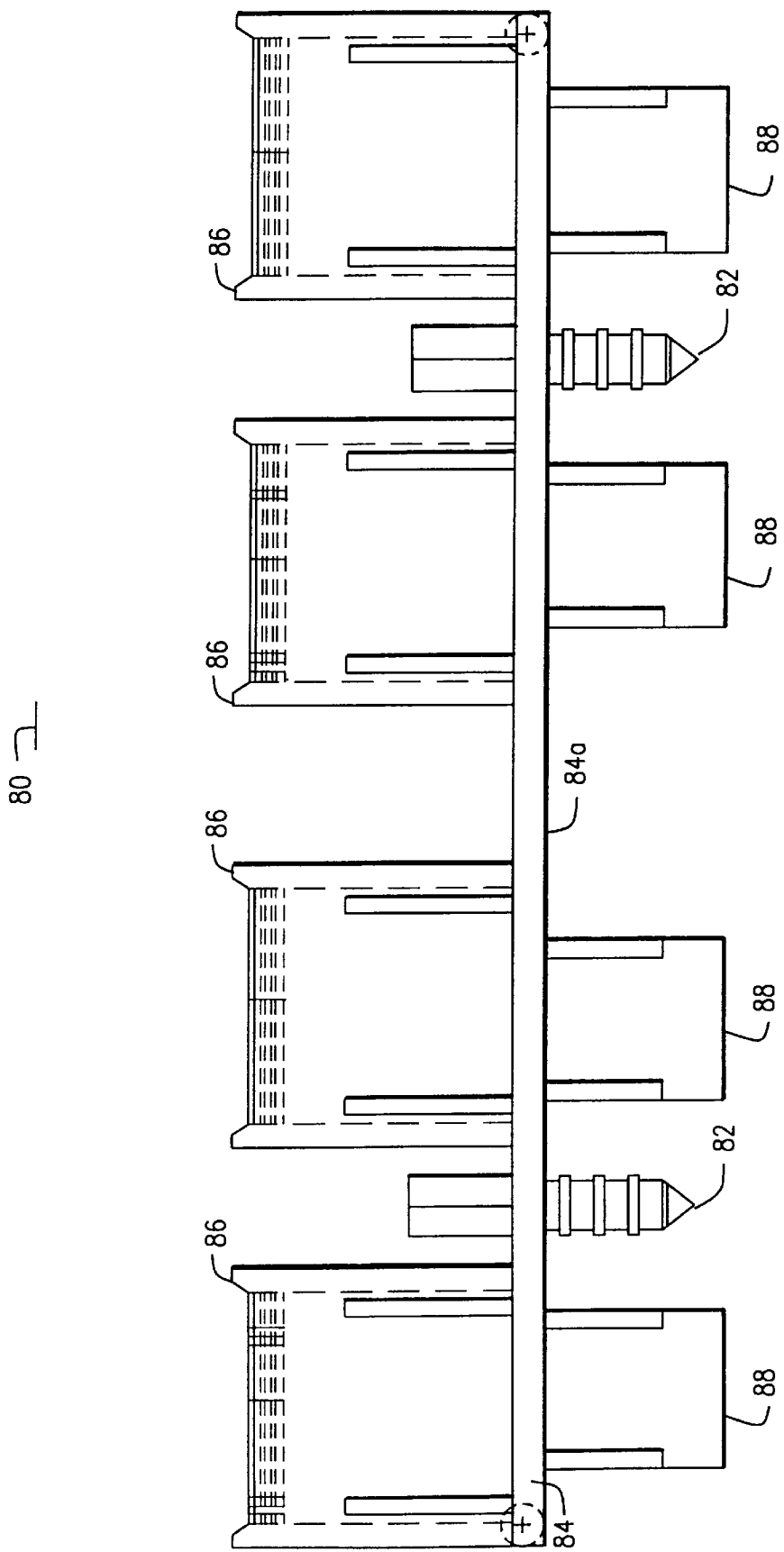
FIG. 6 is a front view of an alternate embodiment of a clamp of the present invention.

FIG. 6 shows an alternative embodiment of the clamp of the present invention. Multiple clamp 80 generally takes the form of a pair of single clamps having the design of clamp 40 and joined at their base by a continuous web 84a. With additional reference to FIG. 1, multiple clamp 80 spans the length of one wall 18 or 20 of box 10. Multiple clamp 80 includes a pair of mounting stems 82 descending from extended base 84. Mounting stems 82 are spatially separated on extended base 84 so as to align with both clamp insertion bores 32 located adjacent either wall 18 or 20. Multiple clamp 80 further includes a plurality of ascending arms 86 and descending arms 88 having the same design characteristics as their counterparts of clamp 40. Ascending arms 86 are spatially located along extended base 84 so as to be positioned adjacent each aperture 25 defined by either wall 18 or 20. Multiple clamp 80 thus allows for a single insertion of a clamp to hold all the wires entering though one wall 18, 20 of outlet box 10. While multiple clamp 80 is shown as a pair of clamps 40 joined by a web 84a, multiple clamp 80 may have any desired length so as to extend along one wall of an electrical junction box. Electricians or other installers can thus choose the length of the clamp they wish to employ when installing fixtures into outlet boxes capable of accommodating multiple fixtures.

As multiple clamp 80 is formed of a pair of single clamps 40, fabrication thereof may be simplified. It is contemplated that a single mold cavity may be employed to form multiple clamp 80. The same single cavity may be used to form a pair of single clamps 40 by blocking the mold runner (not shown) forming web 84a between each clamp. In this manner, a pair of detached single clamps 40 will be formed.

Because the clamp of the present invention is manually removable, installation of a wire into an outlet box is made faster and easier than currently provided by the prior art devices. Once the installer has removed the necessary frangible knockouts 25a from a mounted outlet box 10 to form aperture 25, wire 12 may be threaded therethrough. The installer can then simply insert a clamp 40 or 80 of the present invention into clamp insertion bore 32 of insertion shoulder 30 which will press and hold wire 12 against the top or bottom wall defining the aperture 25. The installer's hands will therefore be free to perform other tasks without continuously holding onto inserted wire 12. If it is later discerned that either more or less wire is required to be inserted in the outlet box, the installer need only manually remove the clamp, or pry the ascending arms away from the wire, and feed the wire in the proper direction through aperture 25. Once the correct length of wire is inserted, the installer can replace the clamp in the insertion shoulder adjacent the aperture to hold the wire in place. Furthermore, should the installer not be the person to connect the electrical fixture to the inserted wire, the present outlet box assembly can hold the inserted wire in place until the person connecting the fixture is finished.

It is further contemplated that clamps 40, 80 of the present invention may be factory installed and sold with outlet boxes having the general characteristics of outlet box 10. It is also contemplated that clamps 40, 80 of the present invention may be provided separately for use with previously sold outlet boxes having the general characteristics of outlet box 10.

While the preferred embodiment of the present invention has been shown and described, it will be obvious in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An electrical junction box assembly for accommodating an electrical cable inserted therein, said assembly comprising:

a junction box including a back wall and a side wall perimetrically extending from said back wall and defining an open end opposite said back wall, said junction box including a cable entry opening in said side wall for permitting insertion of said cable thereinto, said back wall further including a cable clamp mount positioned adjacent said cable entry opening, said cable clamp mount further including a clamp insertion surface, said clamp insertion surface being positioned substantially orthogonal to said cable entry opening, said clamp insertion surface further defining a cable clamp insertion aperture; and a cable clamp manually removably insertable into said cable clamp insertion aperture, said cable clamp having a deflectable cable engagement arm spaced adjacent from said cable entry opening, said deflectable cable engagement arm resiliently supporting said cable inserted through said cable entry opening against said side wall.

2. An electrical junction box of claim 1, wherein said side wall further includes at least one pair of opposing cable entry walls, at least one of said cable entry walls includes a plurality of cable entry openings; and wherein said cable clamp provides a plurality of deflectable cable engagement arms, each of said plurality of cable engagement arms being positioned adjacent one of said plurality of cable entry openings on said at least one of said cable entry walls.

3. A junction box assembly of claim 2, wherein the number of said deflectable cable engagement arms on said cable clamp corresponds to the number of said cable entry openings on said at least one of said cable entry walls.

4. A junction box assembly of claim 1 wherein said deflectable cable engagement arm includes a free end, said free end includes cable engagement ridges for allowing movement of said cable in a cable insertion direction into said box, and said cable engagement ridges opposing movement of said cable in a cable withdrawal direction opposite said cable insertion direction.

5. A junction box assembly of claim 1 wherein said deflectable cable engagement arm is a substantially elongate planar member.

6. A junction box assembly of claim 1 wherein said cable clamp includes a clamp insertion member, said clamp insertion member being removably insertable into said clamp insertion aperture.

7. A junction box assembly of claim 6, wherein said clamp insertion member includes a plurality of annular deflectable rings to provide removable retention within said clamp mount.

8. A junction box assembly of claim 6 wherein said clamp includes a clamp base, said clamp base being an elongate planar member from which said clamp insertion member and said deflectable cable engagement arm orthogonally project.

9. A junction box assembly of claim 8, wherein said deflectable cable engagement arm is positioned in flush edge relationship with said clamp base.

10. A junction box assembly of claim 6, wherein said cable clamp further includes at least one deflectable wall engagement arm adjacent said clamp insertion member.

11. A cable clamp for removable insertion into an electrical junction box, said electrical junction box including a back wall and a side wall extending perimetrically from said back wall, said side wall defining an open end opposite said back wall, said side wall further defining a cable entry aperture for insertion of a cable therethrough, said back wall including a mounting shoulder, said mounting shoulder defining an insertion bore extending into said mounting shoulder in a direction substantially perpendicular to said open end of said junction box, wherein said cable clamp comprises:

an elongate planar mounting base, said mounting base having a first face and a second face, said mounting base further including:

a mounting stem depending from said first face, said mounting stem being removably insertable into said insertion bore on said back wall of said junction box; and a cantileverally flexible ascending arm depending from said second face, said ascending arm being positioned adjacent said cable entry aperture of said side wall of said junction box, said ascending arm engaging said cable inserted through said cable entry aperture so as to allow movement of said cable through said cable entry aperture in an insertion direction into said electrical junction box, said ascending arm opposing movement of said cable in a withdrawal direction opposite said insertion direction.

12. A cable clamp of claim 11, further including a cantileverally flexible descending arm extending from said first face, with said descending arm engagable said side wall so as to provide rigidity to said clamp when engaging said cable.

13. A cable clamp of claim 11, wherein said mounting stem includes a plurality of annular deflectable rings for providing removable engagement of said clamp with said insertion bore.

14. A cable clamp of claim 11, wherein said ascending arm is coplanar with said descending arm and in flush edge relationship with said mounting base.

15. A cable clamp of claim 11, wherein said side wall of said junction box further includes a planar cable entry wall, said cable entry wall defining a plurality of cable entry apertures, and wherein said cable clamp provides an additional ascending arm adjacent each of said cable entry apertures on said cable entry wall, each of said additional ascending arms being able to engage said cable inserted into said junction box through an adjacent one of said cable entry apertures against said cable entry wall.

16. A cable clamp of claim 11, wherein said ascending arm further includes transverse ridges located on a distal end from said base, said transverse ridges engaging said inserted cable.

17. A cable clamp of claim 11, wherein said base includes a pair of tabs extending towards said side wall, said tabs being located on opposite longitudinal ends of said base so as to prevent substantial rotation of said base about said mounting stem.

18. A cable clamp of claim 11 further including an elongate handling member extending from said second face of said mounting base, said handling member being manually graspable to assist in handling and manipulation of said cable clamp.

* * * * *

UNITED STATES PATENT AND TRADEMARK OFFICE
CERTIFICATE OF CORRECTION

PATENT NO. : 5,831,213
DATED : November 3, 1998
INVENTOR(S) : Wright, et al.

It is certified that error appears in the above-identified patent and that said Letters Patent is hereby corrected as shown below:

Column 2, Line 56,      after "aperture", insert -- . --;

Column 2, Line 60,      after "box", insert -- . --;

Claim 12, Column 8, Line 14,   after "face,", delete "with".

Signed and Sealed this

Twentieth Day of July, 1999

Attest:

Q. TODD DICKINSON

*Attesting Officer*      *Acting Commissioner of Patents and Trademarks*